US012486865B2

(12) United States Patent
Jung

(10) Patent No.: US 12,486,865 B2
(45) Date of Patent: Dec. 2, 2025

(54) DOUBLE-JOINT DEVICE FOR PRODUCT

(71) Applicant: Min Woo Jung, Jinju-si (KR)

(72) Inventor: Min Woo Jung, Jinju-si (KR)

( * ) Notice: Subject to any disclaimer, the term of this patent is extended or adjusted under 35 U.S.C. 154(b) by 0 days.

(21) Appl. No.: 18/709,834

(22) PCT Filed: Nov. 11, 2022

(86) PCT No.: PCT/KR2022/017809
§ 371 (c)(1),
(2) Date: Jul. 9, 2024

(87) PCT Pub. No.: WO2023/090773
PCT Pub. Date: May 25, 2023

(65) Prior Publication Data

US 2025/0012316 A1 Jan. 9, 2025

(30) Foreign Application Priority Data

Nov. 16, 2021 (KR) ........................ 10-2021-0157367

(51) Int. Cl.
*E05D 3/06* (2006.01)
*E05D 3/12* (2006.01)
*F16C 11/04* (2006.01)

(52) U.S. Cl.
CPC ................ *F16C 11/04* (2013.01); *E05D 3/12* (2013.01)

(58) Field of Classification Search
CPC .... E05D 3/06; E05D 3/12; E05D 3/14; E05D 3/142; E05D 3/16; E05D 3/125; E05D 3/127; E05D 3/185; E05D 7/04; E05D 7/0423; E05D 7/0415; E05D 7/043; E05D 7/0027; E05D 7/0045; E05D 5/02; E05D 5/062; E05D 2007/0438; E05D 2007/0446; E05D 2007/0453; E05D 2007/0461; E05D 2007/0469; E05D 2007/0476; E05D 2007/0484; E05D 2007/0492; E05Y 2600/41; E05Y 2600/634; E05Y 2600/412; E05Y 2600/45; E05Y 2600/452; E05Y 2600/46; E05Y 2900/132; E05Y 2900/20; E05Y 2900/50; E05Y 2900/531; E05Y 2900/546; E05Y 2201/638; F16C 11/04
See application file for complete search history.

(56) References Cited

U.S. PATENT DOCUMENTS 1,282,435 A * 10/1918 Korb ......................... E05D 3/18 16/360
5,015,026 A 5/1991 Mouri
(Continued)

FOREIGN PATENT DOCUMENTS

JP 0671860 B2 9/1994
JP 08-505191 A 6/1996
(Continued)

*Primary Examiner* — Chuck Y Mah
(74) *Attorney, Agent, or Firm* — NKL LAW; Jae Youn Kim

(57) ABSTRACT

A double-joint device for a product is provided. The double-joint device includes left and right operation pieces rotating at the same angle, in a state in which the operation pieces attached to left and right bodies of a door, a vehicle door, a trunk, a bonnet, a smartphone, a laptop and the like are folded, and are horizontally folded or unfolded, and thus a level difference, a step, and a gap between the left and right operation pieces are prevented.

2 Claims, 6 Drawing Sheets

(56) References Cited

U.S. PATENT DOCUMENTS

| | | | | | |
|---|---|---|---|---|---|
| 5,685,046 | A * | 11/1997 | Neag | E05D 3/127 | 16/334 |
| 2012/0047685 | A1 * | 3/2012 | Ma | H04M 1/022 | 16/354 |
| 2012/0120618 | A1 * | 5/2012 | Bohn | H04M 1/022 | 361/679.01 |
| 2014/0331453 | A1 * | 11/2014 | Hsu | G06F 1/1681 | 16/366 |
| 2018/0292863 | A1 * | 10/2018 | Escamilla | E05D 7/00 | |
| 2020/0040626 | A1 * | 2/2020 | Hatano | F16C 11/10 | |
| 2020/0208458 | A1 * | 7/2020 | Elsmark | E05F 15/63 | |
| 2022/0162892 | A1 * | 5/2022 | Mitsui | E05D 3/18 | |
| 2023/0056050 | A1 * | 2/2023 | Francis | E05D 3/12 | |

FOREIGN PATENT DOCUMENTS

| | | | | |
|---|---|---|---|---|
| JP | 3752604 | B2 | 3/2006 | |
| JP | 2006083558 | A | 3/2006 | |
| JP | 4638764 | B2 * | 2/2011 | H04M 1/022 |
| KR | 101321121 | B1 * | 10/2013 | E05D 3/12 |
| WO | WO-9115646 | A * | 10/1991 | |

* cited by examiner

DOUBLE-JOINT DEVICE FOR PRODUCT

TECHNICAL FIELD

The present invention relates to a double-joint device for a product that allows left and right main bodies to be rotated to be folded at the same angle or unfolded horizontally, in a state in which the double-joint device is attached to the left and right main bodies of a door, a vehicle door, a trunk, a bonnet, a smartphone, a laptop, or the like, and thus, a clearance, a deviation, and protrusion of a folding area are prevented.

BACKGROUND ART

As is widely known, a trunk space, which is a space to store articles, is provided in the rear portion of a vehicle in addition to door hinges, vehicle doors, a trunk, and a bonnet, and a trunk lid that opens and closes the upper part of the trunk space is connected to a hinge of the trunk to be rotated at a designated angle.

The hinge is connected to the vehicle body and the trunk lid, respectively, and when the trunk lid is opened, the trunk lid is lifted upward by the restoring force of torsion bars.

Since the hinge has two torsion bars connected to a hinge bracket, there is a problem that manufacturing efficiency is reduced due to a large number of assembly processes.

Further, in another example, as shown in FIG. 1, a hinge mounted a vehicle door, a laptop, or the like is formed in a structure in which both sides, i.e., left and right sides, of a connection piece are connected to the lower ends of left and right operation pieces to connect the left and right operation pieces in a state in which the left and right operation pieces are spaced apart from each other to face each other.

When the hinge formed with the above structure is unfolded from the folded state (a), a height difference occurs between the left and right operation pieces during rotation of the left and right operation pieces (b), the left and right operation pieces are rotated and unfolded at different angles rather than the same angle and may thus not be unfolded to 180° (c), and in the state in which the left and right operation pieces are unfolded to 180° (d), the left and right operation pieces may not maintain a horizontal state, and the left and right operation pieces are operated to be positioned up and down and thus cause a problem of generating a clearance (f).

Further, as shown in FIGS. 2A-2B, another conventional hinge has a structure in which left and right gears are formed at one end of left and right operation pieces to be engaged with each other, and a connection piece is provided to connect the left and right operation pieces, and the left and right operation pieces are rotated to be folded or unfolded through the engaged gears.

The left and right operation pieces partially protrude in a semicircular shape because the left and right operation pieces are rotated through engagement of the left and right gears, and thus, when the left and right operation pieces are folded, the left and right operation pieces maintains a state in which the left and right operation pieces are spaced apart from each other more than necessary, and when the left and right operation pieces are unfolded, the left and right operation pieces may not maintain an overall flat state due to upwardly protruding portions of the left and right operation pieces.

Therefore, if the left and right operation pieces are rotated through such a gear method, there is a problem that the height of the left and right operation pieces becomes higher than necessary and thus the volume of the hinge increases.

DETAILED DESCRIPTION OF INVENTION

Technical Problem

Therefore, the present invention has been made in view of the above problems, and it is an object of the present invention to provide a double-joint device for a product that is attached to left and right main bodies of a door, a vehicle door, a trunk, a bonnet, a smartphone, a laptop, or the like, so that the left and right main bodies may be folded or unfolded at the same angle and may maintain a uniformly flat state overall when unfolded, so as to prevent a height difference, a step, and a clearance.

Technical Solution

In accordance with an aspect of the present invention, the above and other objects can be accomplished by the provision of a double-joint device for a product in which, in order to connect left and right main bodies, a first operation piece is located on one side of the left and right main bodies in a diagonal direction, and then, one end of the first operation piece is coupled to the left main body, the other end of the first operation piece is coupled to the right main body, a first stopper is coupled to the left main body, and a second stopper is coupled to the right main body, so that the left and right main bodies are folded or unfolded at the same angle.

Advantageous Effects

As described above, the double-joint device of the present invention has a first operation piece mounted diagonally on left and right main bodies of a door, a vehicle door, a trunk, a bonnet, a smartphone, a laptop, or the like, so that the left and right main bodies are folded and unfolded at the same angle to minimize a distance between the left and right main bodies, and maintain a uniformly flat state without any protruding parts of the upper and lower surfaces of the left and right main bodies, thereby having the effect of preventing occurrence of a height difference, a step, and a clearance.

In addition, the double-joint device of the present invention is mounted on the front and rear surfaces of the product, thereby having the effect of operating stably without warping during rotation at the same angle.

MODE FOR CARRYING OUT INVENTION

In order to achieve the above objects and effects, the present invention will be described in detail with reference to the accompanying drawings as follows.

Figure 1:
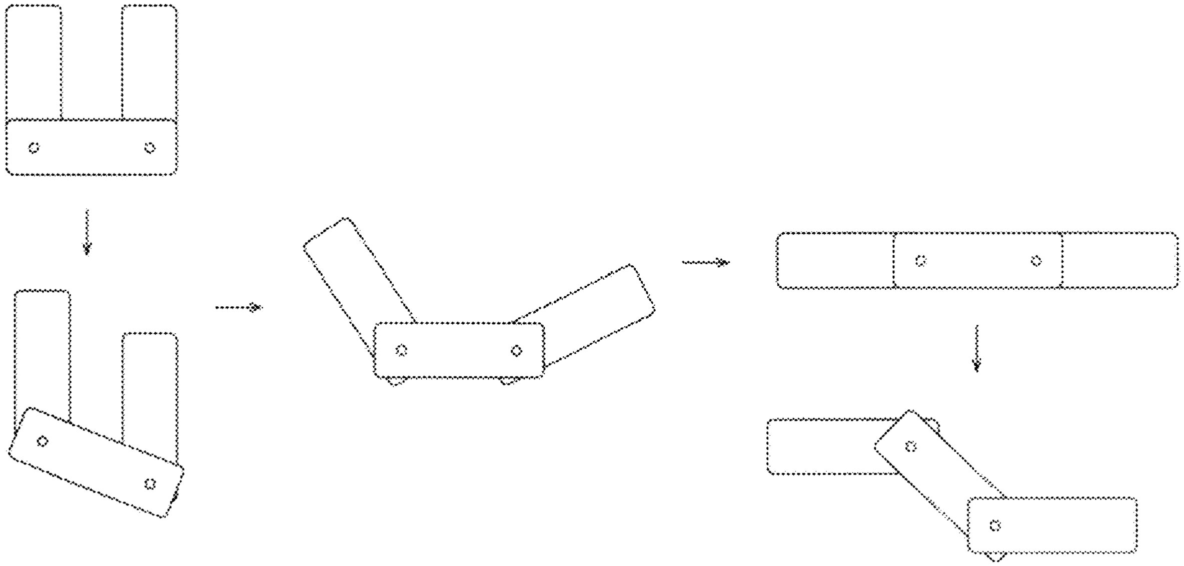
FIG. 1 PRIOR ART
FIG. 1 is a flowchart showing the operating state of a conventional hinge.
Figure 2A:
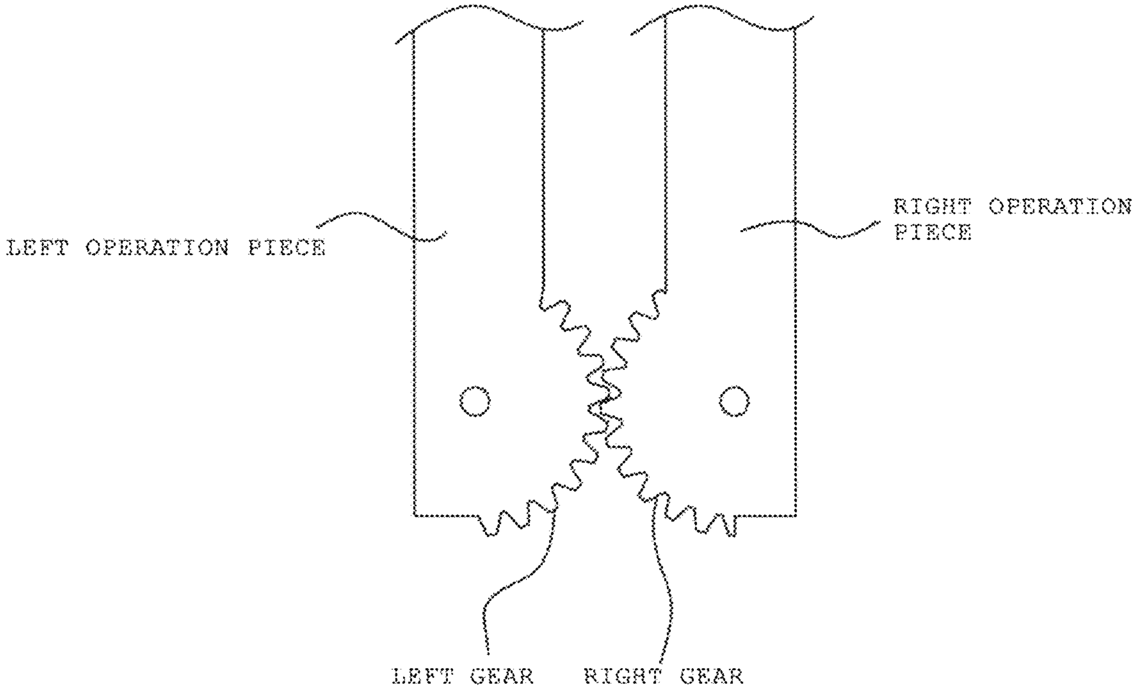
FIG. 2A PRIOR ART
FIGS. 2A-2B are example diagrams showing the operating state of another conventional hinge.
Figure 2B:
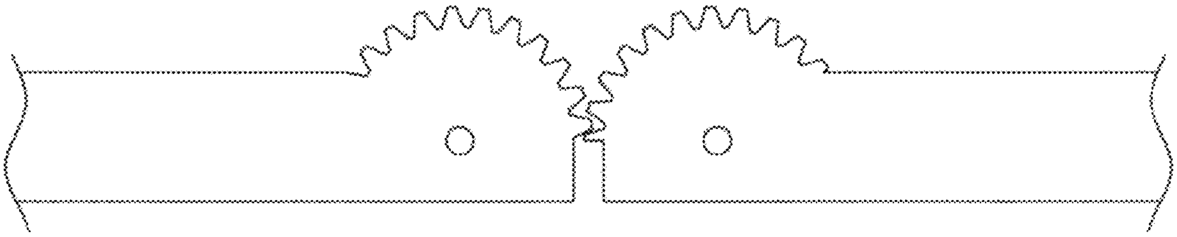
FIG. 2B PRIOR ART
Figure 3:
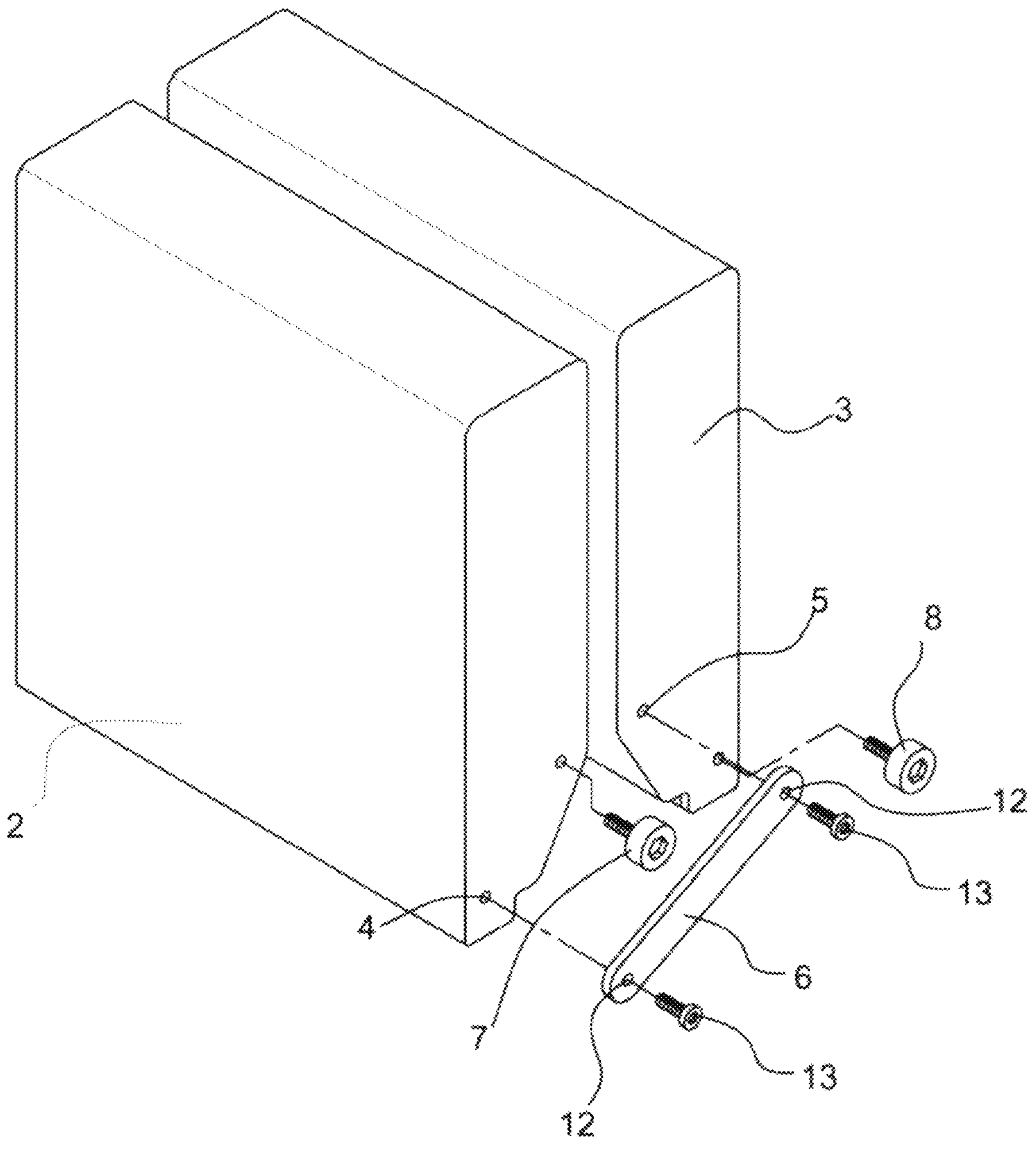
FIG. 3 is a combined perspective view showing a double-joint device for a product of the present invention.
Figure 4:
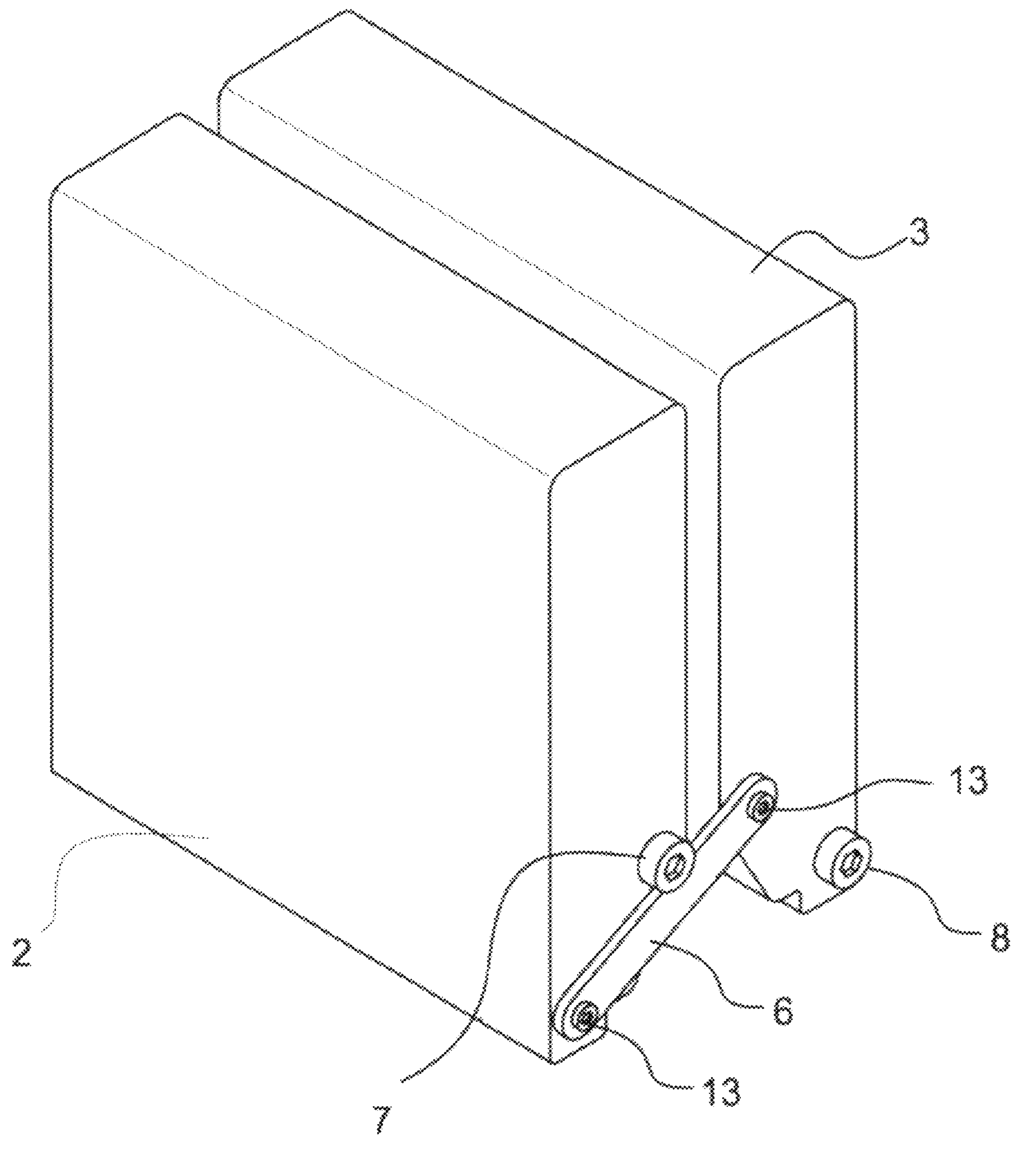
FIG. 4 is a combined cross-sectional view showing the double-joint device of the present invention.

FIG. 3 is a combined perspective view showing a double-joint device for a product of the present invention, and FIG. 4 is a combined cross-sectional view showing the double-joint device of the present invention.

A double-joint device 1 for a product of the present invention includes a first operation piece 6 having both ends coupled to first and second operation holes 4 and 5 by rotation shafts 13, respectively, to connect left and right main bodies 2 and 3, in a state in which the first and second operation holes 4 and 5 are formed in a diagonal direction at different positions on one side of the left and right main bodies 2 and 3, the first operation hole 4 is located at the outer portion of the left main body 2, and the second operation hole 5 is located at the inner portion of the right main body 3, and first and second stoppers 7 and 8 provided on the first and second main bodies 2 and 3 so as to interfere with the upper and lower portions of the first operation piece 6.

In addition, there is a provided a second operation piece 11 having both ends coupled to third and fourth operation holes 14 and 15 by rotation shafts 13', respectively, in a state in which the third and fourth operation holes 14 and 15 are formed in a diagonal direction at different positions on a side opposite to the one side of the left and right main bodies 2 and 3, the third operation hole 14 is located at the inner portion of the left main body 2, and the fourth operation hole 15 is located at the outer portion of the right main body 3, and the second operation piece 11 is located to intersect the first operation piece 6.

Third and fourth stoppers 9 and 10 are provided on the first and second main bodies 2 and 3, respectively, so as to interfere with the upper and lower portions of the second operation piece 11, and thus, when the left and right main bodies 2 and 3 are folded or unfolded, the left and right main bodies 2 and 3 are folded or unfolded at the same angle.

Accordingly, the first and second operation holes 4 and 5 formed in the diagonal direction at different positions on one side of the left and right main bodies 2 and 3 in the state in which the left and right main bodies 2 and 3 are spaced apart from each other so that a pair of left and right main bodies 2 and 3 formed in the same shape may be folded and unfolded.

After the first operation piece 6 comes into close contact with the side of the left and right main bodies 2 and 3 in the diagonal direction, the first operation piece 6 is coupled to the left and right main bodies 2 and 3 by inserting the rotation shafts 13 into insertion holes 12 formed at both ends of the first operation piece 6 and the first and second operation holes 4 and 5.

Insertion holes 12 are also formed at both ends of the second operation piece 11.

The first operation hole 4 of the left main body 2 is located adjacent to one end of the left main body 2, and the second operation hole 5 located on the right main body 3 is located at a position farther away from one end of the right main body 3 and higher than the first operation hole 4.

When the rotation shafts 13 are inserted into the insertion holes 12, the first operation piece 6 may be rotated on the rotation shafts 13, and the rotation shafts are coupled to the first and second operation holes 4 and 5 to be fixed.

Further, the first and second stoppers 7 and 8 are coupled to the left and right main bodies 2 and 3, respectively, so as to interfere with the upper and lower portions of the second operation piece 6.

The first stopper 7 is located at the upper portion of the left main body 2 and coupled thereto, and the second stopper 8 is located at the lower portion of the right main body 3 and coupled thereto.

Accordingly, the first stopper 7 is located above the first operation piece 6, and the second stopper 8 is located below the first operation piece 6.

Figure 5:
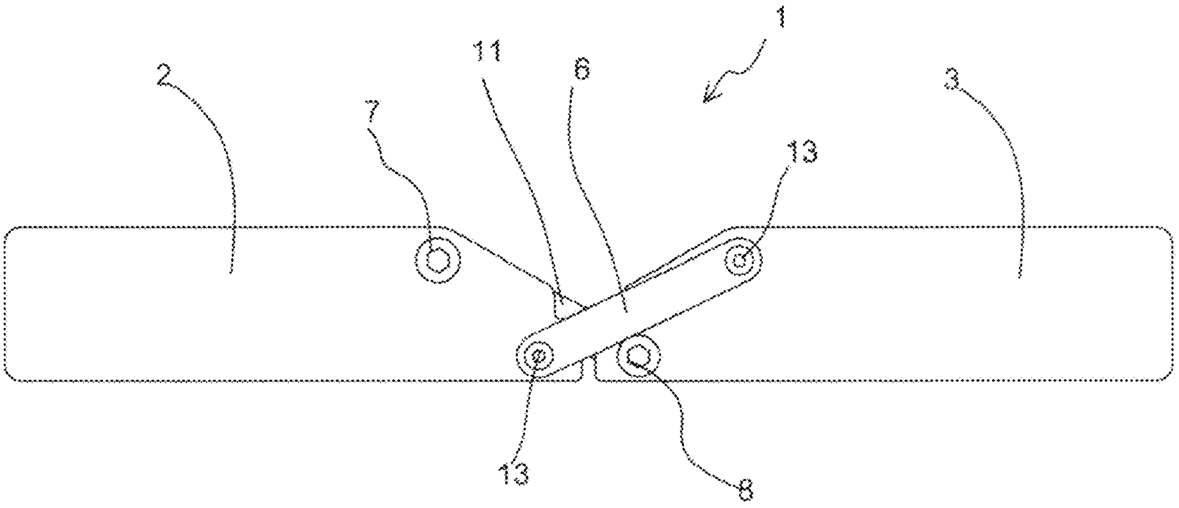
FIG. 5 is a front view showing the double-joint device of the present invention in an unfolded state.
Figure 6:
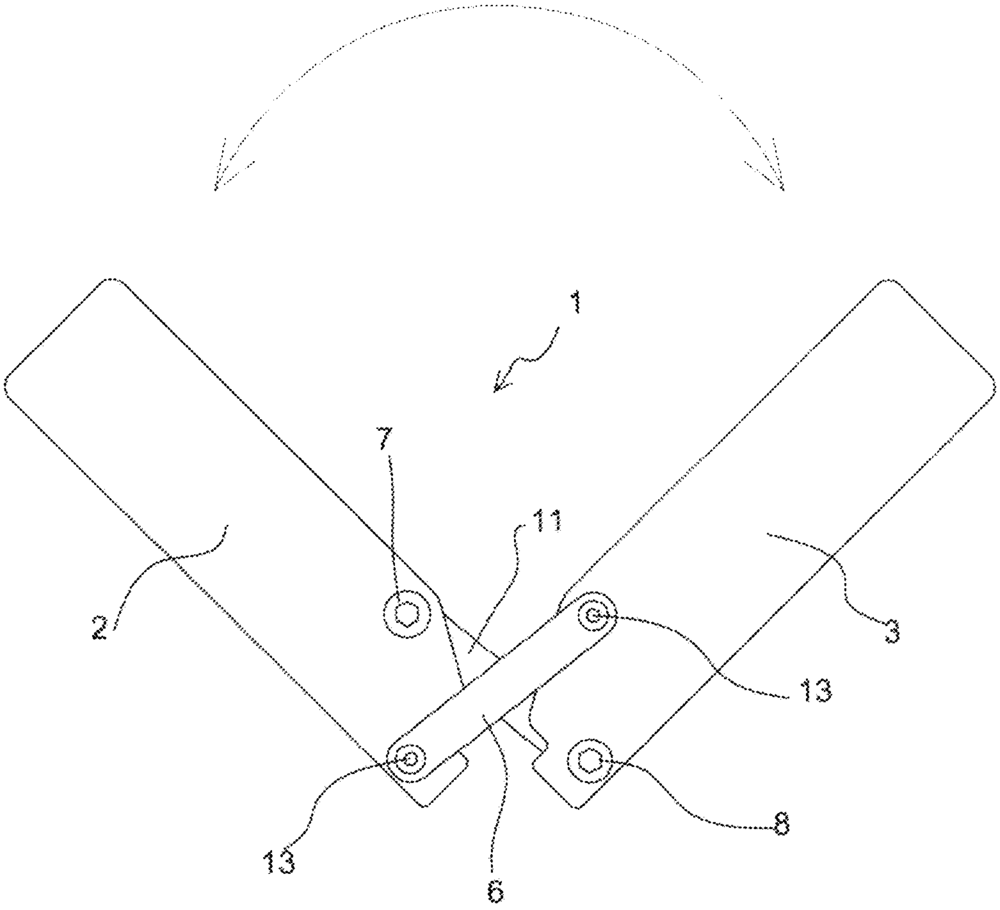
FIG. 6 is a front view showing the double-joint device of the present invention in an operated state at the same angle.

FIG. 5 is a front view showing the double-joint device of the present invention in an unfolded state, and FIG. 6 is a front view showing the double-joint device of the present invention in an operated state at the same angle.

In the double-joint device 1 of the present invention, when the left main body 2 is rotated upward to be folded in the unfolded state of the left and right main bodies 2 and 3, the first operation piece 6 is pulled in the direction of the first operation hole 4 and the other portion of the first operation piece 6 located on the second operation hole 5 is also pulled, and thereby, the left and right main bodies 2 and 3 are rotated at the same angle and folded.

In addition, when the left main body 2 is rotated downward to unfold the folded left and right main bodies 2 and 3, the first operation piece 6 is pulled in the direction of the first operation hole 4 and the other portion of the first operation piece 6 located on the second operation hole 5 is also pulled, and thereby, when the left and right main bodies 2 and 3 are rotated at the same angle and folded, the upper portion of the first operation piece 6 is pressed against and interferes with the first stopper 7 so that the left and right main bodies 2 and 3 are not rotated any further.

On the contrary, when the left and right main bodies 2 and 3 are unfolded, the left main body 2 is rotated downward, the first operation piece 6 is pushed in the direction of the second operation hole 2, the right main body 3 is also rotated at the same angle and unfolded.

As described above, when the left and right main bodies 2 and 3 are unfolded, the lower portion of the first operation piece 6 is pressed against and interferes with the second stopper 8 so that the left and right main bodies 2 and 3 are not rotated any further.

When the left and right main bodies are unfolded horizontally, as described above, parts of the upper or lower surfaces of the left and right main bodies do not protrude and remain flat.

Figure 7:
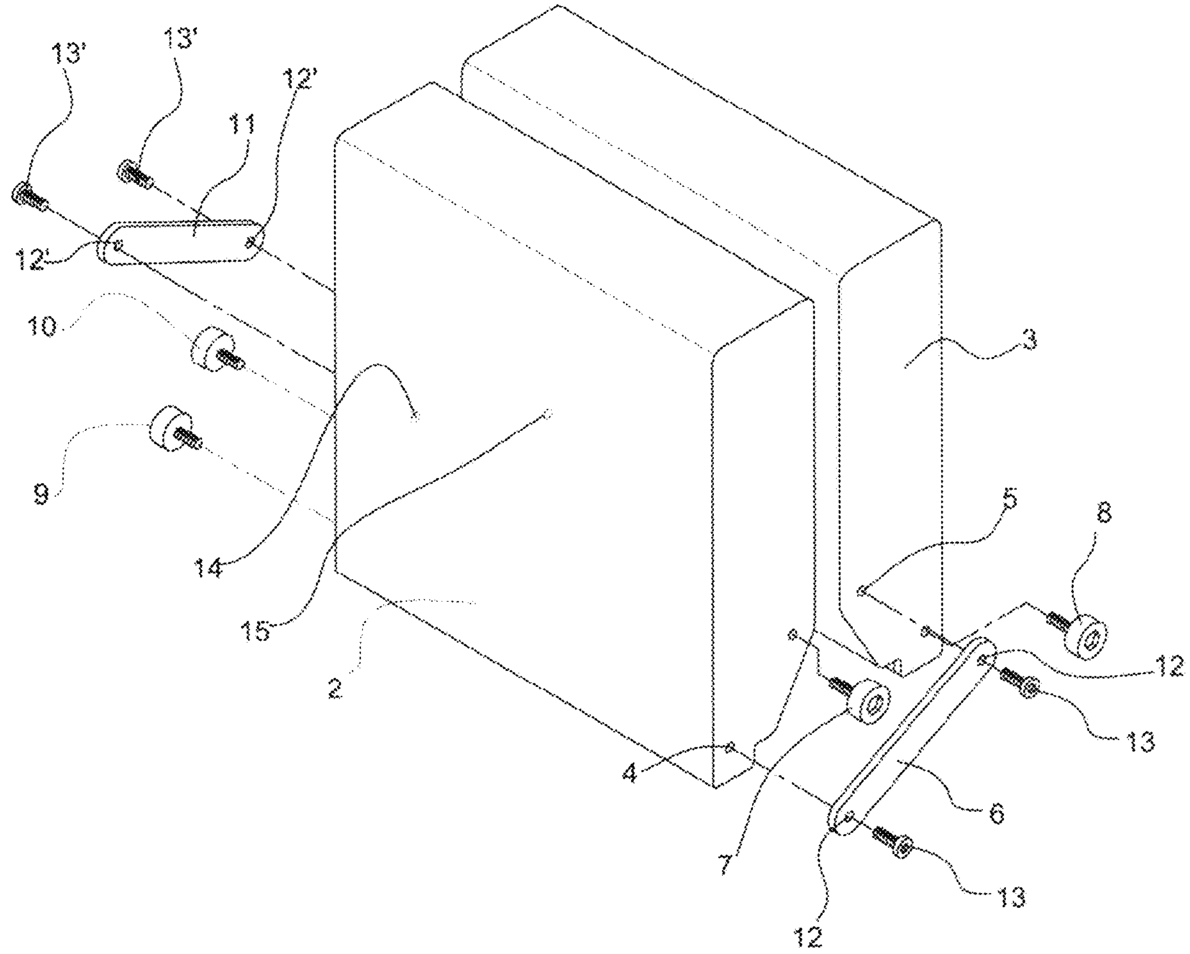
FIG. 7 is an exploded perspective view showing the double-joint device of the present invention in a state of being mounted on front and rear surfaces of the product.

FIG. 7 is an exploded perspective view showing the double-joint device of the present invention in a state of being mounted on front and rear surfaces of the product, the third and fourth stoppers 9 and 10 are coupled to the other side of the left and right main bodies 2 and 3 at the same positions as the first and second stoppers 8 and 9, respectively, and the second operation piece 11 is coupled to the other side of the left and right main bodies 2 and 3 to intersect the first operation piece 6 so as to stably support the left and right main bodies 2 and 3 without shaking during the folding or unfolding operation.

The double-joint device 1 of the present invention is mounted and used on any one of a door, a vehicle door, a trunk, a bonnet, a smartphone, a laptop, and a tablet computer.

The invention claimed is:

1. A double-joint device for a product, the device comprising:

a first operation piece having both ends coupled to first and second operation holes by rotation shafts, respectively, to connect left and right main bodies, in a state in which the first and second operation holes are formed in a diagonal direction at different positions on one side of the left and right main bodies, the first operation hole is located at an outer portion of said one side of the left main body, and the second operation hole is located at an inner portion of said one side of the right main body;

first and second stoppers provided on the first and second main bodies, respectively, so as to interfere with upper and lower portions of the first operation piece;

a second operation piece having both ends coupled to third and fourth operation holes by rotation shafts, respectively, in a state in which the third and fourth operation holes are formed in a diagonal direction at different positions on a side opposite to the one side of the left and right main bodies, the third operation hole is located at an inner portion of the opposite side of the left main body, and the fourth operation hole is located at an outer portion of the opposite side of the right main body, the second operation piece being located to intersect the first operation piece when viewed from the sides of the left and right main bodies; and third and fourth stoppers provided on the first and second main bodies, respectively, so as to interfere with the upper and lower portions of the second operation piece, so that, when the left and right main bodies are folded or unfolded, the left and right main bodies are folded or unfolded at a same angle.

2. The double-joint device according to claim 1, wherein the double-joint device is usable in a state of being mounted on any one of a door, a vehicle door, a trunk, a bonnet, a smartphone, a laptop, a tablet computer, or any combination thereof.

* * * * *